INVENTOR:
ANTHONY V. THOMAS
BY
Dawson, Tilton, Fallon & Lungmus
ATT'YS

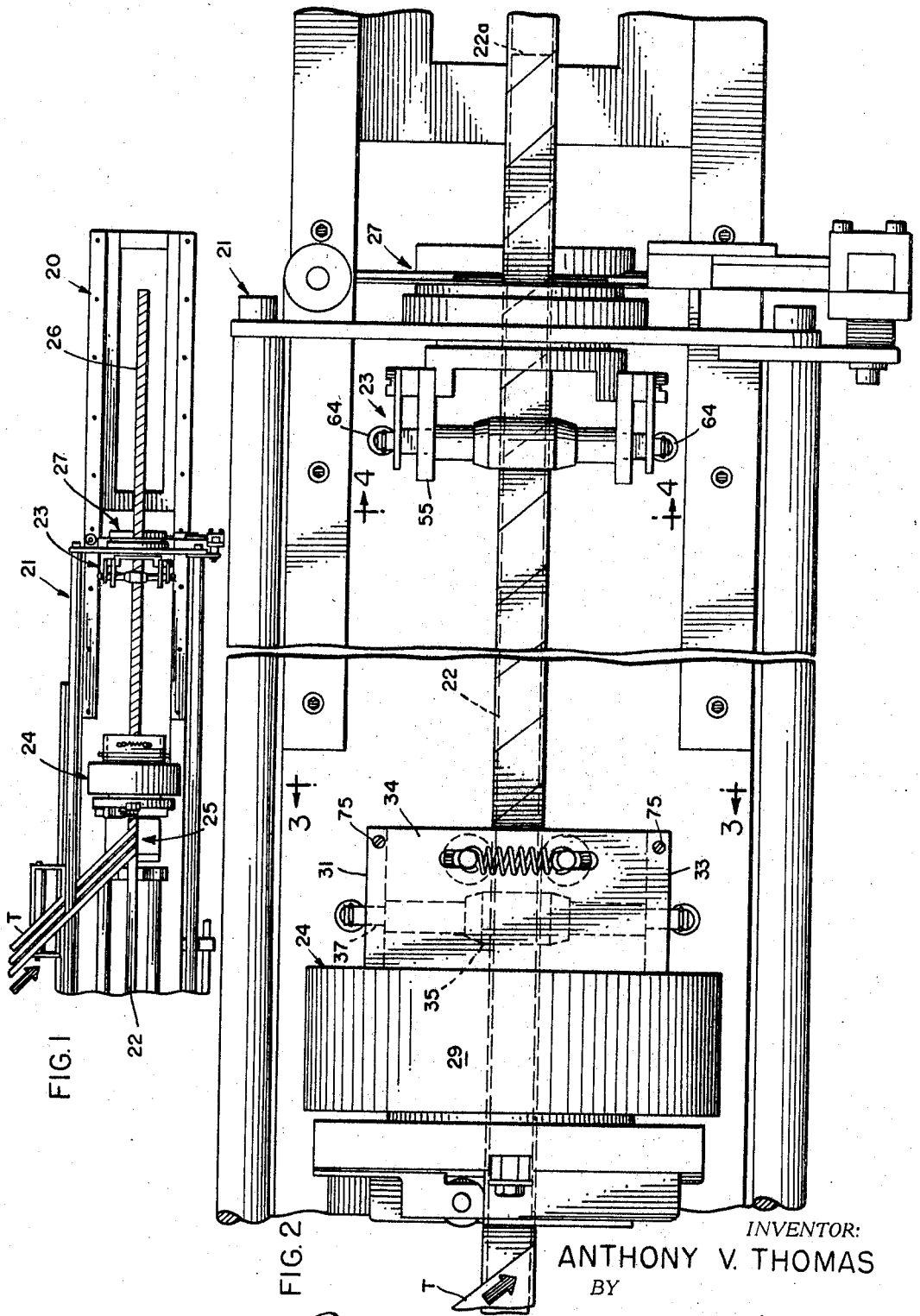

Dec. 9, 1969 A. V. THOMAS 3,482,490
STRIPPER FOR INTERMITTENT SPIRAL TUBE WINDER
Filed March 11, 1968 5 Sheets-Sheet 3

INVENTOR:
ANTHONY V. THOMAS
BY
Dawson, Tilton, Falloy & Lungmus
ATT'YS

Dec. 9, 1969  A. V. THOMAS  3,482,490
STRIPPER FOR INTERMITTENT SPIRAL TUBE WINDER
Filed March 11, 1968  5 Sheets-Sheet 4

*INVENTOR:*
ANTHONY V. THOMAS
BY
Dawsey, Tilton, Falloy & Lungmus
ATT'YS

Dec. 9, 1969  A. V. THOMAS  3,482,490
STRIPPER FOR INTERMITTENT SPIRAL TUBE WINDER
Filed March 11, 1968  5 Sheets-Sheet 5
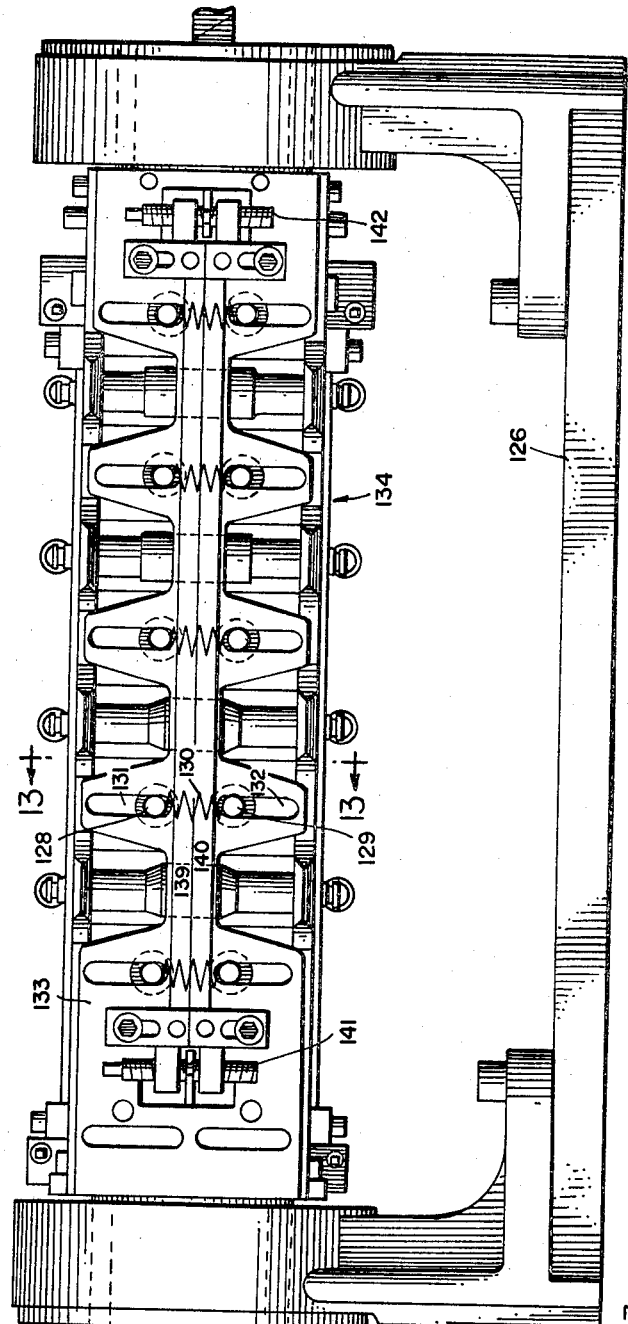
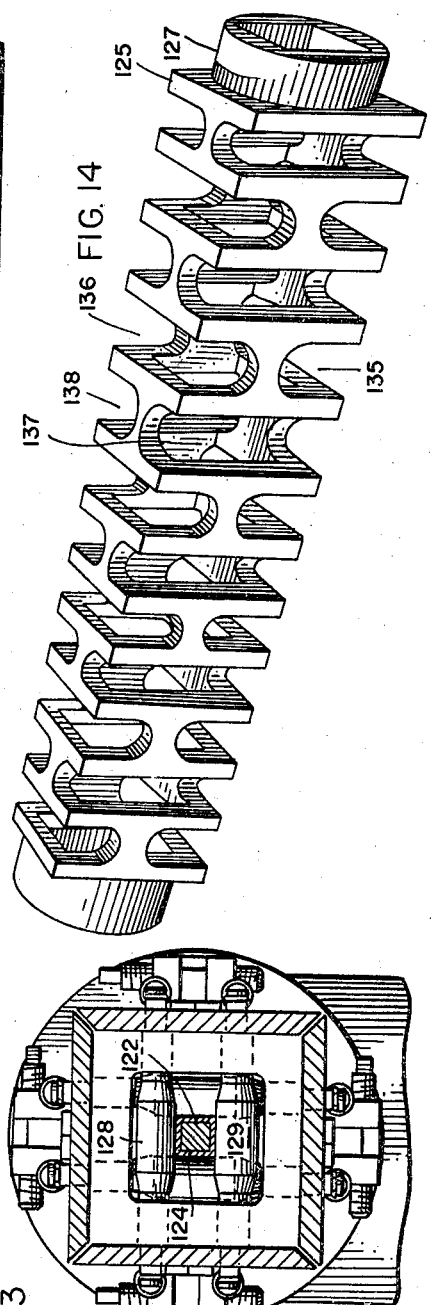
INVENTOR:
ANTHONY V. THOMAS
BY
Dawson, Tilton, Fallon & Lungmus
ATT'YS United States Patent Office 3,482,490
Patented Dec. 9, 1969

3,482,490
STRIPPER FOR INTERMITTENT SPIRAL
TUBE WINDER
Anthony V. Thomas, Prospect Heights, Ill., assignor to Precision Paper Tube Company, Wheeling, Ill., a corporation of Illinois
Filed Mar. 11, 1968, Ser. No. 712,291
Int. Cl. B31c 3/00
U.S. Cl. 93—80     5 Claims

ABSTRACT OF THE DISCLOSURE

An improved stripper for an intermittent spiral tube winder wherein an arbor advances while rotating to perform a winding operation and thereafter retracts from the already wound tube so as to present an overlapping portion suitable for severing—the severed tube being useful as a coil form. The improved stripper or gripper includes one-way roller clutches arranged to bear against the sides of a rectangular tube to restrict the same from returning with the arbor.

Background of invention

The invention finds particular utility in connection with square-tube winders of the type found in Jauch Patent No. 1,625,471 and Macchione patent Reissue No. 25,820. Both of the Jauch and Macchione machines are of the intermittent type. Over the years, tube manufacturers have made use of both intermittent and continuous tube winders. Continuous tube winders are, for the most part, much more complex. The intermittent tube winders are characterized by an advancing, rotating arbor which develops a wound length (6-8 inches in the case of Jauch and 20-30 inches in the case of Macchione) after which the rotation stops, the wound tube gripped, and the arbor retracted to starting position, after which the cycle is repeated. A critical element in the operation of any intermittent winder is the stripping means that restrains the already formed tube from being retracted along with the arbor. Should simultaneous reaction occur, the winding operation may have to be stopped because of the possibility of overwinding, wrinkling of the tapes, etc. In the extreme, a jam or wadding of the tapes can occur which requires dismantling of the machines so as to realign the tapes.

Inasmuch as the tapes are wound relatively tightly on the arbor, a substantial restraining force is necessary in the strippers to prevent a joint retraction, i.e., to provide sufficient gripping force on the tube so as to overcome the friction between the tube interior and the arbor so that the arbor may slidingly retract within the tube. In the past, the strippers have been characterized by the use of metal parts. These metal parts tend to dig into the tube (in order to exert the necessary restraining force) and in some cases develop not only unsightly but unacceptable score marks. It will be appreciated that such forms are used to develop inductors wherein a large number of turns of wire are applied and the value of the inductance is determined by the number and placement of the wire turns. A distorted or otherwise damaged coil form can develop an unacceptable variation in inductance.

With the order of magnitude of pressure that is exerted by the prior art stripping means, there results the possibility of scoring or burring the arbor itself, should the strippers contact a naked arbor. Once this occurs, the frictional engagement between the two is increased so that the desired slidability may be lost, possibly resulting in jams and expensive and extensive down time and repair.

The principle concern, however, is that of preventing retraction of the tube with the arbor, i.e., the elimination of slack or backlash in the stripping mechanism. With mechanical arrangements of the nature taught in both Jauch and Macchione, backlash of an unacceptably high value develops relatively shortly after the machine is put into use. In the Jauch machine, which makes use of ratchets and pawls as well as sliding and rotating knurled rollers, the various metal parts develop excessive backlash. This, as will be pointed out hereinafter, may result in erratic grooving of the roller-receiving slots so as to render the machine unpredictably inoperable. In the Macchione machine, which has the advantage over Jauch in providing a longer tubular segment for each cycle of the arbor, the greater restraining force needed has resulted in a complex stripper mechanism that is difficult to set up and maintain.

According to the invention, all of the foregoing difficulties are avoided through the unique usage of one-way roller clutches as the stripping means. By virtue of this arrangement, the advantage of the Macchione machine over the Jauch machine in providing longer tube segments each cycle is preserved yet without the difficulties in set up, maintenance and operation. Here it should be appreciated that contemporary production techniques result in the tubes having lengths of the order of about 24 inches. Thus a Jauch-type machine requires about three cycles for such a tube. Notwithstanding the less efficient operation of a Jauch-type machine, the same is preferred by some winders because of its more compact nature—this being tolerable where a quantity production is not critical.

It is therefore an object of this invention to provide an improved stripper for both of the prior art type intermittent square tube winding machines. Additionally, the invention provides a unique secondary gripping means for a Macchione-type machine, i.e., the one associated with the "traveling cut-off."

Detailed description

The invention is described in conjunction with two embodiments in the accompanying drawing in which—

FIG. 1 is a fragmentary top-plan view of the winding end of a Macchione-type machine;

FIG. 2 is a fragmentary enlarged top-plan view of the central portion of FIG. 1;

FIG. 12 is a bottom-plan view of the gripper seen in FIG. 11;

FIG. 13 is a sectional view such as is seen along the sight line 13—13 of FIG. 12; and FIG. 14 is a perspective view of the chassis portion of the gripper seen in FIGS. 10–13.

Figure 3:
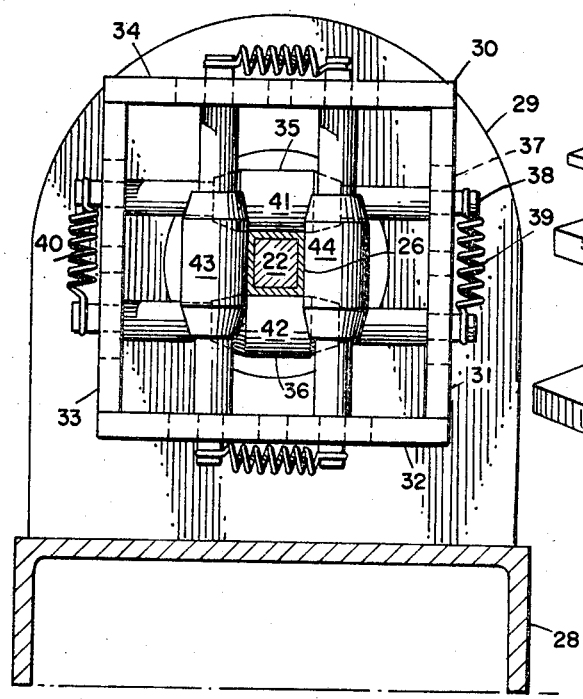
FIG. 3 is a sectional view taken along the sight line 3—3 of FIG. 2 and showing details of the basic gripper, i.e., the one employed for stripping the tube from the arbor during retraction of the latter.

In the illustration given and with particular reference to FIG. 1, the numeral 20 designates generally the frame of a horizontally elongated machine. Further details of this machine may be seen in the above-mentioned Macchione patent Reissue No. 25,820. The various prime mover details at the extreme left end of the machine have been eliminated from FIG. 1 for ease of description. The operational parts of the machine relevant to the instant invention include a traveling carriage generally designated 21 which provides a means for advancing an arbor 22. The extreme end of the arbor 22 is designated 22a in FIG. 2. The carriage 21 at its extreme left-hand end (not shown) may be coupled to a hydraulic cylinder for the purpose of advancing the carriage and arbor together (as in FIG. 10 to be described hereinafter). Stabilizing the arbor adjacent its unsupported end 22a is a traveling gripper mechanism generally designated 23—this being carried by the carriage 21.

The arbor 22 is caused to rotate during its forward movement, i.e., during its travel to the right as shown. Rotation of the arbor is achieved by means of the stationary gripper generally designated 24. The stationary gripper or, more precisely, the tube "stripper" is positioned along the machine length just forward of the tape applicator position generally designated 25. As can be best seen in FIG. 1, three tapes are provided in angled relation to the axial direction of the arbor and as the arbor rotates and is advanced, these tapes are wound in overlapping relation to form a "square" tube. It will be appreciated that most of the tubes produced on intermittent machines of this type for usage as coil forms have a cross-section but it will be appreciated that plural-sided tubes of other configurations may be equally advantageously developed. For that purpose, the term "rectangular" is used herein to designate plural-sided tubes whether they be triangular, rectangular, square, polygonal, etc.

In the operation of the apparatus thus far described, the carriage 21 advances in a winding cycle toward the right, meanwhile, the stationary stripper mechanism 24 rotating the arbor 22 which is advancing with the carriage 21. This causes the tapes T to be wound as at 25 and a tube continuously developed. As the carriage 21 reaches the right-hand end of its stroke, rotation of the arbor 22 ceases, the carriage 21 retracts (i.e., moves to the left) and the arbor 22 is withdrawn from the tube 26 leaving the same in cantilevered relation to the arbor. At that time, a cut-off mechanism generally designated 27 and associated with the right-hand end of the carriage 21 operates to transversely sever the tube—in a fashion described in greater detail in the above-mentioned Reissue Patent No. 25,820. Thereafter the cycle is repeated and the severed tube segments are collected in a bin or other storage (not shown).

Stripper mechanism

Figure 6:
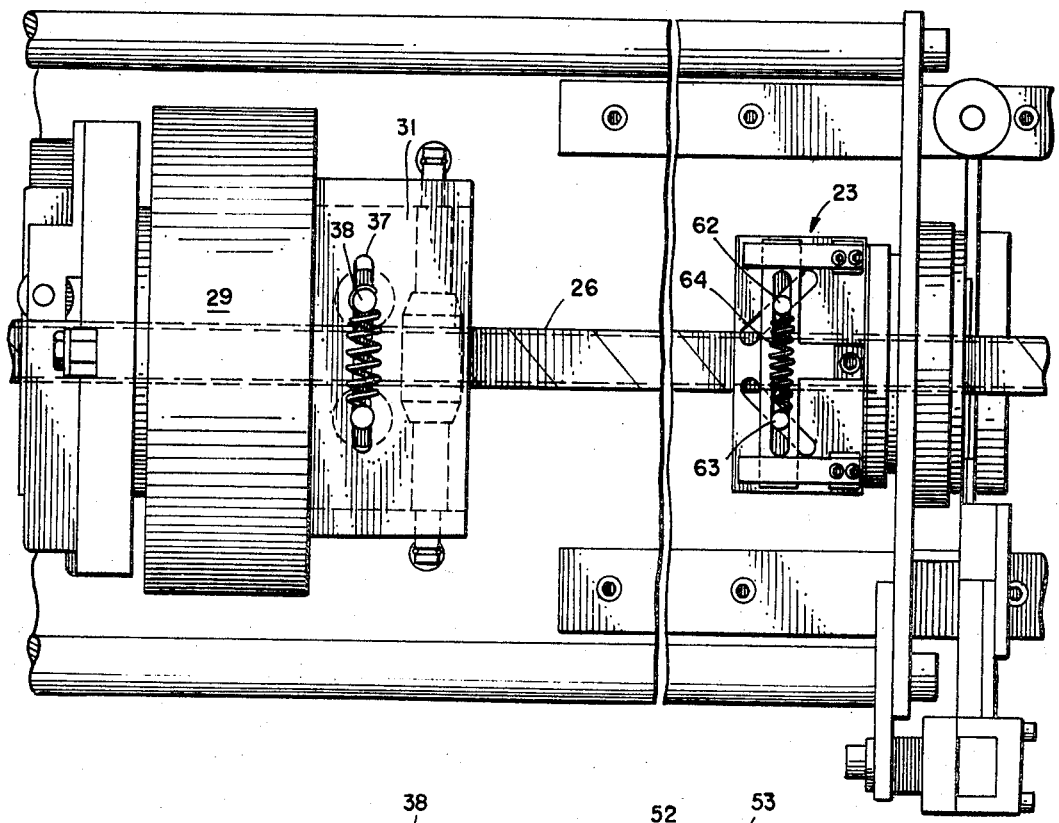
FIG. 6 is a top-plan view of the right-hand portion of FIG. 1 and thus corresponds essentially to the right-hand portion of FIG. 2 but wherein the arbor in FIG. 2 has been rotated 90° so that the gripper portion in FIG. 6 is essentially a side elevation of that seen in FIG. 2.

The stripper mechanism associated with the stationary gripper 24 can be best appreciated from a consideration of FIGS. 2, 3 and 6. Referring first to FIG. 3, the numeral 28 designates a fragment of a pedestal provided as a stationary part of the frame 20, i.e., the pedestal 28 is rigidly integrated with the frame 20. Extending upwardly from the pedestal 28 is a housing 29 which contains gearing (not shown) employed to rotate a chassis 30. As will be appreciated from what has gone before, the chassis 30 is rotated intermittently, i.e., only during the advancement portion of the arbor reciprocating cycle. From a comparison of FIGS. 2 and 3, it is seen that the chasis 30 is essentially of an open-box construction, having four sides as at 31, 32, 33 and 34. The sides are arranged in opposing pairs with the sides 31 and 33 supporting a first pair of one-way roller clutches 35 and 36. For this purpose, the sides 31 and 33 are equipped with vertically-extending grooves as at 37. Received within the groove 37 are the journals generally designated 38 (see FIG. 7) of a typical one-way roller clutch 35. The journals of the first pair of roller clutches 35 and 36 are resiliently tied together by means of springs 39 and 40. Thus, the central portions 41 and 42 are urged together in clamping relation to the tube 26. A similar arrangement is employed for the one-way roller clutches 43 and 44 (see FIG. 3) extending between the opposed sides 32 and 34.

Figure 7:
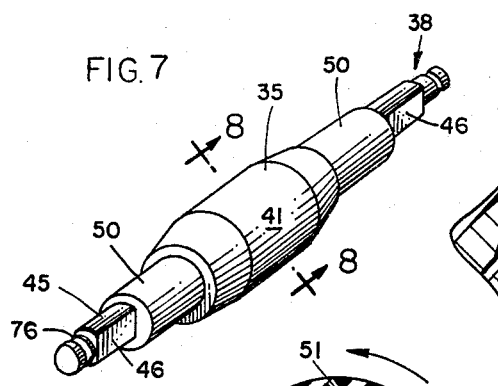
FIG. 7 is a perspective view of one of the one-way roller clutches employed in the grippers seen in the preceding views.
Figure 9:
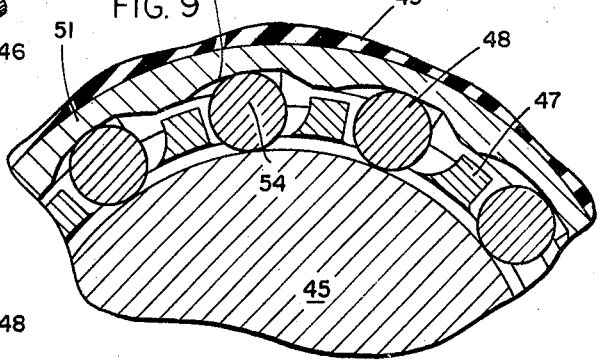
FIG. 9 is an enlarged fragmentary detail of FIG. 8.
Figure 8:
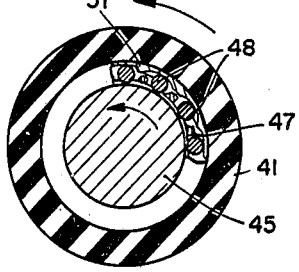
FIG. 8 is a transverse sectional view such as would be seen along the sight line 8—8 applied to the one-way roller clutch of FIG. 7.

The operation of the roller clutches as exemplified by the element 35 in FIG. 7 can be best appreciated from a consideration of FIGS. 7–9. The journal 38 extends from one end of the element to the other providing a through shaft 45. This shaft is equipped with flats as at 46 (see FIG. 7) so as to be non-rotatably received within the slots 37. Rotatably mounted about the shaft 45 is a needle-bearing cage 47 equipped with axially elongated needle bearings 48. Clamped around the exterior of the cage 47 is a rubber sleeve 49 which provides the roller portion 41. The rubber sleeve 49 extends beyond the axial length of the cage 47 and is supported on spacers 50. The cage 47 consists of inner and outer parts with the outer part 51 being equipped with camming surfaces 52. Thus, as the outer rubber sleeve 49 is attempted to be rotated in the direction of the arrow 53, the needle-bearing elements 48 are forced clockwise, i.e., in the direction of the arrow 53 (see FIG. 9) so as to "clutch" the shaft 45 and thereby substantially immobilize the roller 41. In contrast, when the sleeve 48 is subjected to a rotational force tending to rotate the same in a counterclockwise direction (in the form pictured in FIG. 9), there is free rotation. The one-way roller clutches are arranged so that only 2–3 minutes of backlash rotation are required before the sleeve 49 is immobilized so as to restrict any tendency of the tube 26 to move in company with the arbor 22.

Traveling gripper

Because of the length of tubing produced each cycle, it is desirable in a Macchione-type machine to provide a gripper to insure that the tube 26 does remain immobile relative to the arbor as the arbor 22 is advanced during a winding cycle. The traveling gripper 23 is seen in FIGS. 2 and 4–6 and utilizes the same type of one-way roller clutches that were previously described in conjunction with the stripper mechanism 24. Optimum results have been obtained in the practice of the invention utilizing roller clutches designated RC–061008 of the Torrington Company of Torrington, Conn., these clutches also being shown in U.S. Patents Nos. 3,184,020 and 3,194,368.

Figure 5:
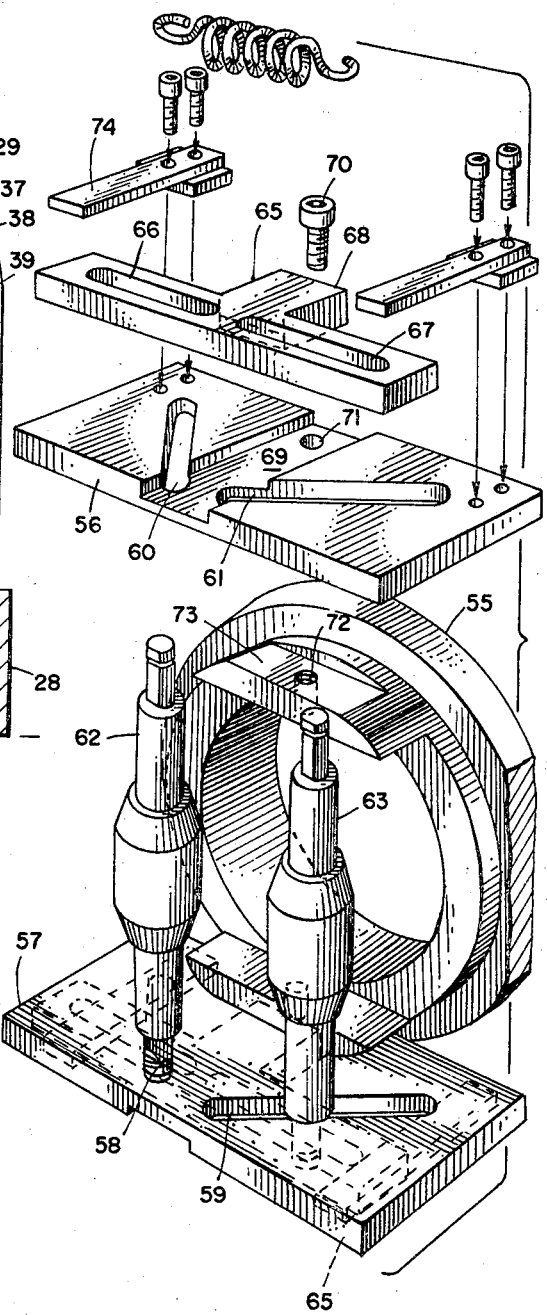
FIG. 5 is an exploded perspective view of the traveling cut-off gripper of FIG. 4.
Figure 4:
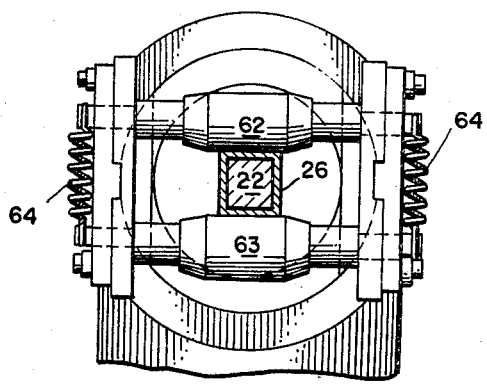
FIG. 4 is a fragmentary sectional view taken along the sight line 4—4 of FIG. 2 and showing in detail the gripping means associated with the "traveling cut-off;"

For the traveling gripper which grips the tube 26 on the forward stroke of the arbor but releases any clamping pressure thereon during retraction of the arbor, I provide a subframe 55 (see FIGS. 2 and 5). The subframe 55 includes a pair of opposed plates 56 and 57 (see FIG. 5) each of which is equipped with a pair of angled, i.e., convergent slots as at 58 and 59 in the plates 57 and 60 and 61 in the plate 56. Slidably mounted within opposing slots, i.e., 58 and 60, and 59 and 61 is a pair of roller clutches 62 and 63. As can be appreciated from FIG. 6, the journal ends of the clutches 62 and 63 are interconnected by means of a spring 64, a similar spring being provided to couple the other journal ends. The cooperating slots permit the parallel arranged roller clutches 62 and 63 to move into clamping relation with a tube 26 on the arbor 22 (see FIG. 4).

To achieve centering of the two clutches 62 and 63, I provide a pair of supplemental bars as at 65 in FIG. 5. The bars 65 are slotted as at 66 and 67 to receive the journals on the ends of the clutches 62 and 63. The bars 65 are maintained in a predetermined position by means of a block portion 68 slidably received within a slot 69 in the corresponding plate 56 or 57, as the case may be. By virtue of the cooperation of the block 68 and the slot 69, the bar 65 maintains a predetermined orientation— one in which the length of the slots 66 and 67 is perpendicular to the axis of the arbor 22. As larger arbors or thicker tapes T are used to form the square tubes 26, the block 68 moves in the slot 69 to accommodate outward movement of the journals of the clutches 62 and 63 in the slots 60, 61, etc. The plates 56 and 57 are secured to the housing 55 by virtue of Allen screws 70 passing through openings 71 into threaded bores 72 in integral flanges 73 (see FIG. 5). The bars 65 are maintained in place by means of clips 74 which are threadably secured to the adjacent plates in the manner indicated in FIG. 5. Thus, the above-mentioned sliding movement of the bars 65 is readily accommodated.

It will be seen that the traveling gripper 23 differs from the stationary stripper in utilizing only one pair of roller clutches. The slots 58–61 are also angled but this arrangement may also be advantageously employed in the stripper 24. In the stripper 24, the four plates 31–34 are maintained in orthogonal (i.e., mutually perpendicular) relation by means of their attachment to the gearing (not shown) within housing 29. Additionally, machine bolts 75 (see FIG. 2) secure the plates in the open-box construction shown and described. The spacers 50 maintain the bearing cage 47 (and thus the sleeve 49) in centered relation with respect to the arbor 22. Although the shafts 45 are slidable axially with the cages 47 and spacers 50, there is no rotation of the shafts 45 tending to make them lose their seating within the slots 37. Further, the springs 39, 40, etc. serve as stops to prevent any axial movement of the shafts 45.

When disassembly is required, it is only necessary to remove the springs 39, 40 from the journals 38 (more precisely from the annular grooves 76—see FIG. 7) and then slide the shafts axially out of one of the slots 37. Thereupon, the remainder of the roller clutch 35 (i.e., the sleeve 49 with its internally received cage 47 and spacers 50) is readily removable from the chassis 30 merely by moving the same longitudinally of the machine.

However, even on jams or wrap-ups, the distorting tubing is readily removed without dismantling as was necessary previously—it only being necessary to overcome the spring bias and hold the clutches apart.

Modified Jauch machine

Figure 10:
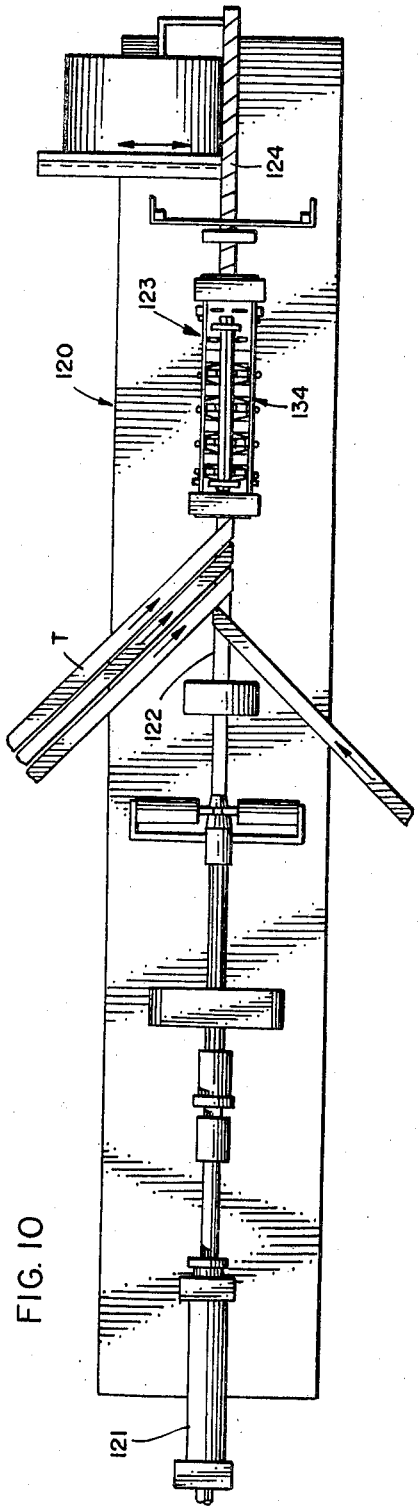
FIG. 10 is a top-plan view of a portion of a Jauch-type machine equipped with the inventive gripper.
Figure 11:
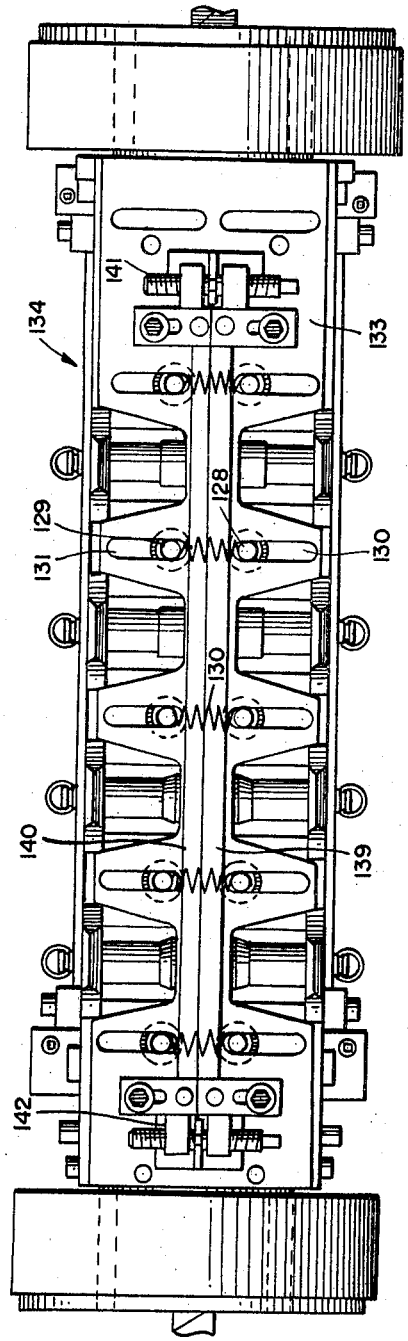
FIG. 11 is an enlarged detail of the gripper portion of FIG. 10.

Turning now to FIGS. 10–14, the numeral 120 designates generally (in FIG. 10) the frame of a Jauch-type machine. At the extreme left-hand end is seen a cylinder and piston rod unit 121 which is operative to advance and retract an arbor 122. Tapes T are automatically wound around the arbor 122 as the latter is driven during advancement, i.e., movement to the right. In FIG. 10, the numeral 123 designates generally a stripper means which is employed to provide a restraining action on the wound tube 124 as the arbor is retracted. In other respects the machine shown is conventional.

To provide the novel stripping means, a subframe 125 (see FIG. 14) is provided which is rotatably mounted within a pedestal arrangement 126 (see FIG. 12) provided as part of the frame 120. It will be seen that the journals 127 at the ends of the subframe 125 are equipped with bores corresponding to the shape of the tube-equipped arbor 122 and it is intended that the subframe 125 rotate with the arbor 122.

To provide the desired gripping action, opposed pairs of clutch elements are provided as at 128 and 129 in FIG. 13. Each pair of clutch elements has corresponding ends resiliently coupled together as by springs 130 (see FIG. 12). The journal ends of the clutch elements are non-rotatably supported within slots 131 and 132 provided in the orthogonally related cover plates 133 provided on the subframe 125, the plates and subframe being bolted together to constitute a chassis 134.

As one proceeds along the length of the chassis 133, it will be noted that the pairs of clutch elements are displaced 90° in proceeding from set to set. The actual number of sets (nine in the illustration given) may be varied depending upon the amount of restraining force desired. The subframe 125 is fabricated to provide alternating pairs of recesses 135, 136, 137 and 138 (FIG. 14). These recesses receive the various clutch members, the subframe rigidifying the chassis 134.

In the operation of the Jauch-type stripper, the opposed pairs of clutch elements 128 and 129 resiliently grip the tube 124 and are, of themselves, virtually without backlash. This is in direct contrast to the ratchet and pawl arrangement previously employed in Jauch where substantial backlash or slack would occur as wear progressed. For set up, the inventive arrangement is distinctly superior in requiring only two springs for each pair (one at each end of a given clutch element) as contrasted to four springs previously required. Notwithstanding the advantages in ease of set up—and here it will be appreciated that a machine must be versatile in accommodating arbors of different cross-sectional dimensions for different size tubes—substantial advantages accrue from the inventive arrangement insofar as operation and maintenance are concerned. In the prior art construction, the rollers actually rotated within the elongated chassis and, as a result, tended to develop grooves or pockets in the side walls of the slots 131 and 132. Such grooves or indentations could literally result in a camming action to prevent the resilient mounting of the knurled rollers in the prior art construction, often resulting in jamming or wadding so that substantial down time resulted. To remedy this, expensive repairs were required in the chassis. In contrast, the journals of the clutch elements here do not rotate so that there is no tendency to wear grooves in the side walls of the supporting slots 131 and 132.

For larger sized arbors, the paired clutches merely position themselves further apart in the slots 130 and 131. Spacers bars 139, 140 are employed on each plate 133 to limit contraction of the springs 130 so that the entire chassis may be removed from its position about the arbor 124 without derangement of the clutches. Also, means are provided at 141 and 142 to vary the distance between spacer bars 139, 140 although the journals normally do not contact these bars.

While in the foregoing specification a detailed description of the invention has been set down for the purpose of illustration, many variations of the details hereingiven may be made by those skilled in the art without departing from the spirit and scope of the invention.

I claim:

1. In the apparatus for the intermittent conversion of tapes into a tube of generally rectangular cross-section which includes a horizontally-elongated frame, and elongated arbor of generally rectangular cross-section mounted on said frame for rotation about the axis thereof and for axial movement in the direction longitudinally of said frame, means for advancing and retracting said arbor, means for supplying a plurality of tapes to said arbor at an angle to the length thereof, means on said frame for rotating said arbor during the advance thereof to helically wind said tapes on said arbor, and stripper means on said frame located in a position forward of the points of tape engagement with said arbor for coactive operation with said arbor in restraining a tube from being retracted with said arbor when the latter is retracted, the improved stripper means comprising:

a chassis having an opening there through in which said arbor is received, said chassis having a plurality of shaft-mounting slots therein arranged to support resiliently interconnected elongated rollers in generally rectangular arrangement, and a plurality of one-way, smooth-surface, cam-type roller clutches mounted on said chassis with each roller contacting a given side of said tube for rolling contact therewith only upon arbor advance.

2. The apparatus of claim 1 in which gripper means are movably positioned on said frame for movement with said arbor and located a spaced distance forward of said stripper means, said gripper means including a slot-equipped block having a pair of one-way roller clutches adapted to contact opposite sides of said tube in non-rotatable relation only on the forward stroke of said arbor, said block being arranged and constructed to automatically center said roller clutches upon change in size of said tube.

3. The structure of claim 1 in which said chassis includes four orthogonally related plates, said slots being provided in each of said plates and arranged to provide a first pair of said clutches in longitudinally offset relation to a second pair of said clutches, said clutches having flattened journals to non-rotatably slide in said slots, and spring means resiliently interconnecting corresponding journals of each clutch of a given pair to urge the same into gripping relation with a tube ensleeved on said arbor.

4. The structure of claim 3 in which said clutches are equipped with through shafts providing said journals, said roller clutches also including sleeve means positioned within said orthogonally related parts, said through shafts being slidable within said sleeve means to permit ready dismantling of said stripper means.

5. The structure of claim 3 in which said chassis includes a unitary subframe within said orthogonally related plates, said subframe having recess portions accommodating said clutches, and spacer bar means on said chassis limiting the movement toward each other of clutches in each pair, said chassis accommodating more than two pairs of said clutches.

References Cited
UNITED STATES PATENTS

| | | | |
|---|---|---|---|
| Re. 25,820 | 7/1965 | Macchione | 93—80 |
| 1,625,471 | 4/1927 | Jauch | 93—80 |

BERNARD STICKNEY, Primary Examiner